July 1, 1958 R. P. BURR 2,841,641

IMAGE-REPRODUCING APPARATUS

Filed Aug. 2, 1954

2,841,641
Patented July 1, 1958

2,841,641

IMAGE-REPRODUCING APPARATUS

Robert P. Burr, Huntington, N. Y., assignor to Hazeltine Research, Inc., Chicago, Ill., a corporation of Illinois Application August 2, 1954, Serial No. 447,244

8 Claims. (Cl. 178—5.4)

This invention relates to image-reproducing apparatus for television receivers and, more particularly, to color-image-reproducing apparatus of the projection type for color-television receivers.

In color-television projection systems, it is extremely important that component color images projected to a display screen from a plurality of cathode-ray tubes be maintained in exact register to reproduce a single composite multicolor image. The component color images developed by the cathode-ray tubes must also be maintained in focus. It has heretofore been proposed to control the register of the images developed by the cathode-ray tubes by adjusting the position of electromagnetic focus winding housings relative to the tubes to position the individual image rasters as desired. Focus of the images developed by the cathode-ray tubes has previously been controlled by adjustment of the current flow through the focus windings. For some applications it may be undesirable to vary the focus current and the position of the focus winding housings to accomplish focus and register of the component color images.

It is an object of the present invention, therefore, to provide a new and improved image-reproducing apparatus for a television receiver which avoids one or more of the above-mentioned limitations of systems heretofore proposed.

It is another object of the present invention to provide a new and improved color-image-reproducing apparatus for a color-television receiver in which adjustment of the focus and register of the component color images displayed as a single image on a screen is facilitated.

In accordance with a particular form of the invention, in a television receiver, image-reproducing apparatus comprises a cathode-ray image-reproducing device having an associated magnetic cathode-ray beam focus unit. The apparatus also includes an adjustable magnetic shunt cooperative with the beam focus unit and displaceable in two dimensions for primarily controlling the focusing of the image-reproducing device in response to displacements in one dimension and having a nonuniform characteristic along the other dimension for primarily controlling the position of the reproduced image in response to displacements in the other dimension.

For a better understanding of the present invention, together with other and further objects thereof, reference is had to the following description taken in connection with the accompanying drawing, and its scope will be pointed out in the appended claims.

Referring to the drawing.

Figure 1:
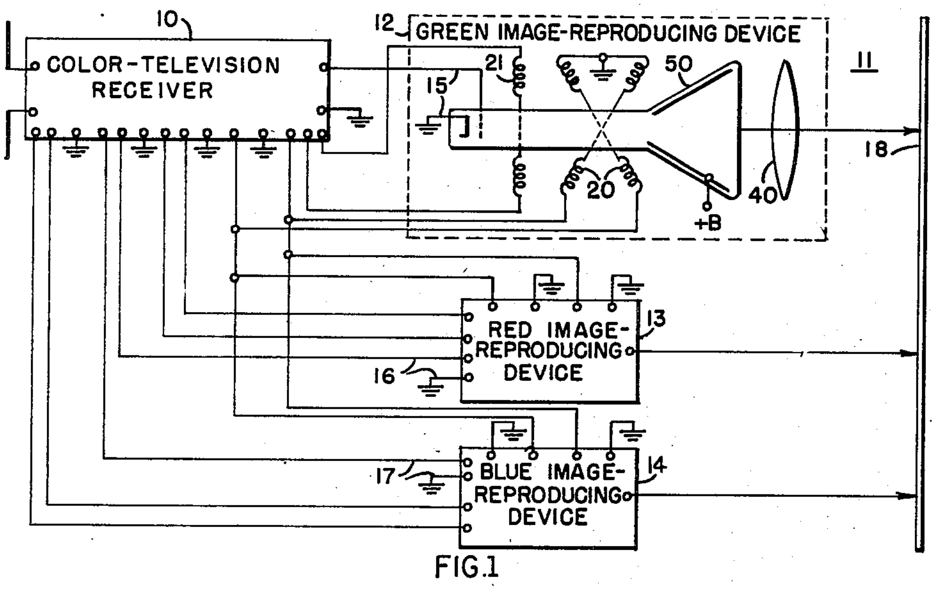
Fig. 1 is a diagram, partly schematic, of a color-television receiver including color-image-reproducing apparatus of the projection type, constructed in accordance with the invention.

Referring now more particularly to Fig. 1 of the drawing, there is represented a color-television receiver 10 including conventional receiver circuits of a type more fully described in the copending application of W. F. Bailey, Serial No. 429,941, filed May 14, 1954, entitled "Color-Image-Reproducing Apparatus of the Projection Type." There is associated with the receiver 10 color-image-reproducing apparatus 11 of the projection type comprising, for example, green, red, and blue image-reproducing devices 12, 13, 14, respectively, having input circuits 15, 16, 17 connected to video-frequency signal-supply circuits of the receiver 10 for supplying, for example, green, red, and blue video-frequency signals to control electrodes and cathodes of three cathode-ray image-reproducing tubes which develop, in conjunction with suitable light filters (not shown), green, red, and blue color images for projection to a display screen 18 in register.

Cathode-ray tube 50 of the green image-reproducing device 12 has the usual electrodes and beam-deflection windings 20 for causing the cathode-ray beam of the tube to scan the face thereof in a conventional manner. The device 12 also includes an electromagnetic beam focus winding 21 housed in a unit, more fully described hereinafter, for focusing the cathode-ray beam of the tube 50. There is also provided a suitable lens or other optical system, represented for purposes of explanation by converging lens 40, for projecting the green image to the display screen in register with the other component images to form a single multicolor image. Devices 13 and 14 preferably are of similar construction to the device 12 with the exceptions that they include red and blue image-reproducing cathode-ray tubes, respectively.

Figure 2:
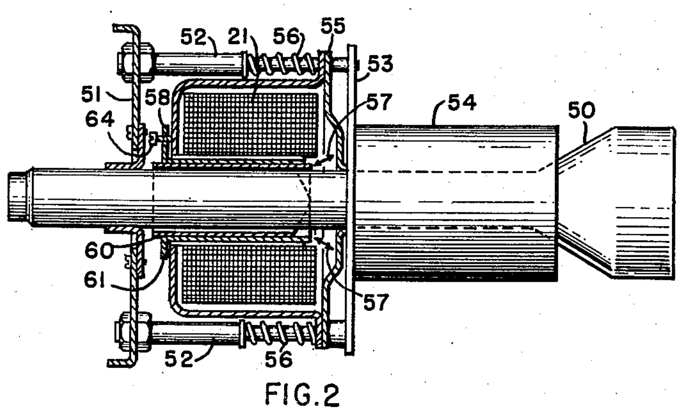
Fig. 2 is a view, partly in section, of one of the image-reproducing devices of the Fig. 1 apparatus.

Referring now more particularly to Fig. 2 of the drawing, the cathode-ray tube 50 is supported by a suitable clamp 51 attached to a pair of mounting studs 52, 52 on a base plate 53. The bulb of the cathode-ray tube is supported by suitable means (not shown) within a housing 54 for the deflection windings 20. An electromagnetic beam focus unit 55, including the beam focus winding 21 represented diagrammatically, is mounted on the studs 52, 52 and may be adjustably positioned thereon by means of springs 56, 56 and suitable screws (not shown). The housing 55 of the winding 21 has an internal air gap indicated by arrows 57, 57 for allowing a magnetic focus field to develop in the neck of the cathode-ray tube 50 to focus a beam thereof.

Figure 3:
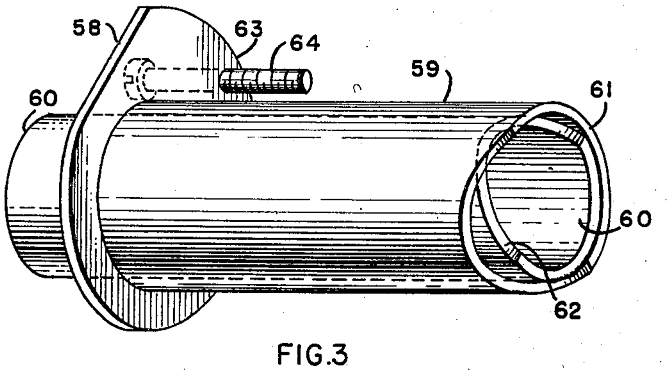
Fig. 3 is a perspective view of a magnetic shunt employed in the Fig. 1 apparatus.

There is also provided an adjustable magnetic shunt 58 cooperative with the beam focus unit and longitudinally displaceable along the neck of the cathode-ray tube for altering the length of the air gap of the housing 55 for primarily controlling the focusing of the cathode-ray tube in response to longitudinal displacements of shunt 58. As represented in Fig. 3, the shunt 58 has a nonuniform characteristic along a second dimension for primarily controlling the position of the image developed on the cathode-ray tube face, and thus the register of the component color images, in response to displacements in the second dimension. More particularly, the shunt 58 preferably comprises a pair of concentric nested hollow cylinders 59, 60 individually having nonuniform edges 61, 62, respectively, which form one side of the air gap 57. By nonuniform is meant, for example, that at least a part of the edge is in a plane at an oblique angle to the axis of the cylinder as indicated by the drawing. The cylinder 60 is rotatable within the cylinder 59 for adjusting the shape of the over-all effective edge of the shunt and for altering the air gap in this manner. That is to say, by mutual rotation of the cylinders 59 and 60 the plane of their effective combined edges, and consequently the plane of the one side of gap 57, may be varied from normality with the axis of tube 50 in any direction from that axis. The shunt 58 has a flange 63 through which a suitable adjusting screw 64 is threaded for longitudinally displacing the shunt. Suitable means for adjusting and maintaining the angular position of cylinder 60 with respect to cylinder 59 may be provided although the adjustment may be accomplished by direct manual grasp of cylinder 60 and its position may be maintained by simple frictional engagement with cylinder 59.

Referring again to Fig. 2, the shunt 58 may be longitudinally displaced by adjustment of the screw 64 which abuts the focus winding housing 55. The magnetic field developed by the focus winding attracts the shunt into the housing to the position determined by the length of the screw 64 extending between the flange of the shunt and the housing. Longitudinal displacement of the shunt 58 alters the length of the air gap 57 and focuses the cathode-ray beam of the tube 50. Rotation of the cylinder 60 within the cylinder 59 alters the shape of the effective edge of the shunt extending into the air gap. This alters the distribution of the magnetic field within the neck of the cathode-ray tube, causing a slight displacement (e. g. tilting) of the effective magnetic lens formed by the magnetic focusing field. Slight displacement of the effective magnetic lens primarily causes the position of the image raster to move on the cathode-ray tube face with only a negligible effect, if any, on the focus. In this manner, the green image may be brought into exact register with the red and blue images projected by the other cathode-ray tubes. It will be understood that rotation of the shunt 58 as a whole is also effective to alter the register. Moreover, if the shunt 58 is nonuniformly magnetized around its edge, rotation of the shunt is effective to alter the register due to the magnetization of the shunt. Nonuniform magnetization in this manner would be the equivalent of nonuniform edges 61 and 62.

From the foregoing description it will be apparent that color-image-reproducing apparatus constructed in accordance with the invention has the advantage that adjustment of the focus and register of the component color images displayed on the display screen is facilitated.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver including display screen color-image-reproducing apparatus of the projection type for displaying component color images in register comprising: three cathode-ray image-reproducing tubes, having associated electromagnetic cathode-ray beam focus units having air gaps for allowing magnetic focus fields to develop in the cathode-ray tubes, for individually developing components of a composite multicolor image to be reproduced; an optical system for projecting the components of the multicolor image to the display screen in register for observation as a single composite image; and an adjustable magnetic shunt cooperative with one of the beam focus units and comprising a pair of cylinders longitudinally displaceable for primarily controlling the focusing of one of the cathode-ray tubes in response to longitudinal displacements, the cylinders being rotatable with respect to each other and rotatable together and individually having nonuniform edges extending into one of the air gaps for providing an effective nonuniform edge of adjustable shape for primarily controlling the register of the image components in response to rotation of the cylinders.

2. In a television receiver, image-reproducing apparatus comprising: a cathode-ray image reproducing device having an associated magnetic cathode-ray beam focus unit; and an adjustable magnetic shunt cooperative with said beam focus unit and displaceable in two dimensions for primarily controlling the focusing of said image-reproducing device in response to displacements in one dimension and having a nonuniform characteristic along the other dimension for primarily controlling the position of the reproduced image in response to displacements in the other dimension.

3. In a color-television receiver, color-image-reproducing apparatus for displaying component color images in register comprising: a plurality of cathode-ray image-reproducing devices having associated magnetic cathode-ray beam focus units for individually developing component color images individually representative of primary colors of a composite color image; means for effectively combining said component color images in register for observation as a single composite image; and an adjustable magnetic shunt cooperative with one of said beam focus units and displaceable in two dimensions for primarily controlling the focusing of one of said image-reproducing devices in response to displacements in one dimension and having a nonuniform characteristic along the other dimension for primarily controlling the register of said component color images in response to displacements in the other dimension.

4. In a color-television receiver including a display screen, color-television apparatus of the projection type for displaying component color images in register comprising: a plurality of cathode-ray image-reproducing devices having associated magnetic cathode-ray beam focus units for individually developing component color images individually representative of primary colors of a composite color image; an optical system for projecting said component color images to the display screen in register for observation as a single composite image; and an adjustable magnetic shunt cooperative with one of said beam focus units and displaceable in two dimensions for primarily controlling the focusing of one of said image-reproducing devices in response to displacements in one dimension and having a nonuniform characteristic along the other dimension for primarily controlling the register of said component color images in response to displacements in the other dimension.

5. In a color-television receiver including a display screen, color-television apparatus of the projection type for displaying component color images in register comprising: a plurality of cathode-ray image-reproducing devices, having associated magnetic cathode-ray beam focus units having air gaps for allowing magnetic focus fields to develop in the cathode-ray devices, for individually developing component color images individually representative of primary colors of a composite color image; an optical system for projecting said component color images to the display screen in register for observation as a single composite image; and an adjustable magnetic shunt cooperative with one of said beam focus units and longitudinally displaceable for altering the length of the corresponding air gap for primarily controlling the focusing of one of said image-reproducing devices in response to longitudinal displacements and having a nonuniform characteristic along a transverse dimension and adjustable in shape and in angular orientation for primarily controlling the register of said component color images in response to displacements in the transverse dimension.

6. In a color-television receiver, color-image-reproducing apparatus for displaying component color images in register comprising: a plurality of cathode-ray image-reproducing tubes having associated magnetic cathode-ray beam focus units having air gaps for individually developing component color images individually representative of primary colors of a composite color image;

means for effectively combining said component color images in register for observation as a single composite image; and an adjustable magnetic shunt cooperative with one of said beam focus units and displaceable in two dimensions for primarily controlling the focusing of one of said image-reproducing tubes in response to displacements in one dimension and having a nonuniform edge extending into the corresponding air gap and rotatable about one of said cathode-ray tubes for primarily controlling the register of said component color images in response to rotation of said shunt.

7. In a color-television receiver, color-image-reproducing apparatus for displaying component color images in register comprising: a plurality of cathode-ray image-reproducing devices having associated magnetic cathode-ray beam focus units having air gaps for individually developing component color images individually representative of primary colors of a composite color image; means for effectively combining said component color images in register for observation as a single composite image; and an adjustable magnetic shunt cooperative with one of said beam focus units and displaceable in two dimensions for primarily controlling the focusing of one of said image-reproducing devices in response to displacements in one dimension and having an edge of adjustable shape extending into one of said air gaps and rotatable for primarily controlling the register of said component color images in response to adjustment of the shape and rotation of said edge.

8. In a color-television receiver, color-image-reproducing apparatus for displaying component color images in register comprising: a plurality of cathode-ray image-reproducing devices having associated magnetic cathode-ray beam focus units having air gaps for individually developing component color images individually representative of primary colors of a composite color image; means for effectively combining said component color images in register for observation as a single composite image; and an adjustable magnetic shunt cooperative with one of said beam focus units and comprising a pair of cylinders longitudinally displaceable for primarily controlling the focusing of one of said image-reproducing devices in response to longitudinal displacements, said cylinders being rotatable with respect to each other and rotatable together and individually having nonuniform edges extending into one of said air gaps for providing an adjustable effective nonuniform edge for said shunt for primarily controlling the register of said component color images in response to rotation of said cylinders.

References Cited in the file of this patent

UNITED STATES PATENTS

| | | |
|---|---|---|
| 2,568,543 | Goldsmith | Sept. 18, 1951 |
| 2,587,074 | Sziklai | Feb. 26, 1952 |
| 2,594,382 | Bedford | Apr. 29, 1952 |
| 2,594,383 | Bedford | Apr. 29, 1952 |
| 2,611,816 | Darke | Sept. 23, 1952 |